Aug. 19, 1958 — I. F. SCHRECK — 2,848,247
MEANS FOR PRODUCING DIFFERENTIAL
STEERING OF A PAIR OF WHEELS
Filed May 5, 1955 — 2 Sheets-Sheet 1

INVENTOR
Irvin F. Schreck
BY McCoy, Greene & TeGrotenhuis
ATTORNEYS

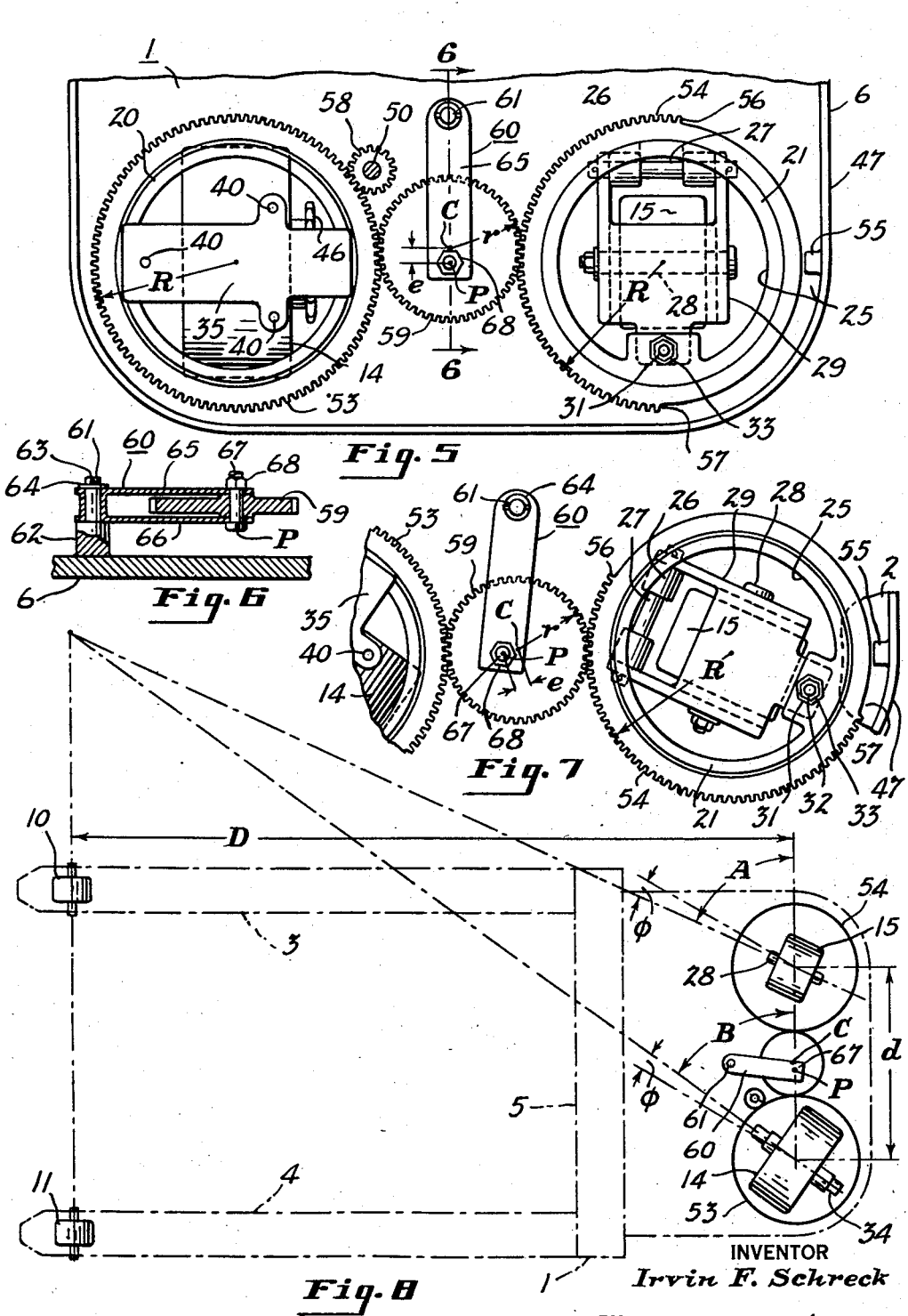

United States Patent Office 2,848,247
Patented Aug. 19, 1958

2,848,247

MEANS FOR PRODUCING DIFFERENTIAL STEERING OF A PAIR OF WHEELS

Irvin F. Schreck, South Euclid, Ohio

Application May 5, 1955, Serial No. 506,306

10 Claims. (Cl. 280—96)

The present invention rleates to a steering mechanism for vehicles and more particularly to a steering mechanism for positioning the wheels of a vehicle at the proper angle so as to permit short radius turns with a minimum amount of lateral slip.

Heretofore automotive-type two-wheel steering mechanisms for industrial trucks have been unsatisfactory since they caused excessive slippage and wear on tires on short radius turns. The present invention provides a simple and inexpensive two-wheel steering mechanism which provides a close approximation to a theoretically correct steering action and minimizes wear on the tires.

According to the invention a pair of main gears are operably connected to the swiveled wheels of a vehicle to steer the same and the swiveled wheel nearest the center of turning of the vehicle is caused to rotate farther than the other swiveled wheel by rotating both main gears simultaneously in the same direction while at the same time turning the gears relative to each other through an angle which is substantially a function of the sum of the angles of rotation of said gears. By providing suitable mechanism so that the tangent of one-half of said first-mentioned angle is substantially proportional to the versine of the sum of the angles of rotation of said swiveled wheels from their straight-ahead positions, the wheels may be turned substantially to the correct positions for any turn.

The desired motion may be obtained by providing rotatable gearing or the like for swinging the swiveled wheels simultaneously in the same direction and means responsive to relative bodily movements of certain of the gears for causing incremental angular movement of each main gear, that is imposed upon that caused by rotation of said gearing, increasing the angular movement of one main gear while decreasing the angular movement of the other main gear.

The differential rotation may be obtained by means of a small gear that engages the periphery of a main gear. By imparting a controlled harmonic movement to the center of the small gear, during rotation of said gear, in a direction substantially tangent to the main gear so that the gears remain in engagement, the desired incremental movement may be imparted to the main gear. Such harmonic movement may, for example, be obtained by constraining movement of the small gear in any suitable manner so that a point spaced from its center moves toward and away from the main gear substantially along a radial line through the center of the main gear while the center of the small gear moves substantially along a line perpendicular to said radial line. The incremental angular rotation of the main gear due to moving the center of the small gear adds to or subtracts from the rotation of said main gear due to rotation of the small gear depending on which way said center is moved. By imparting a predetermined harmonic motion of small magnitude to said center in accordance with the amount of rotation of the small gear, an incremental angle of rotation may be imparted to the main gear that is substantially proportional to the versine of the angle of rotation of the small gear.

The steering mechanism of the present invention is constructed in such a manner that each swiveled wheel is turned about the same angular amount proportional to the amount of rotation of the small gear and the incremental angular rotation of each wheel due to movement of the center of the small gear during rotation thereof is added to the angular rotation of one swiveled wheel while being subtracted from that of the other swiveled wheel so that said wheels turn relative to each other out of parallel relation during steering.

While various cam, lever and linkage systems may be employed to cause the necessary relative movements of the gears in the steering mechanism of the present invention, it is preferable to employ a simple system wherein a single small gear is movably mounted between two larger gears and has its movement so constrained that its center has a harmonic motion toward and away from the line of centers of the larger gears as the gears are rotated.

An object of the invention is to provide a simple and inexpensive steering mechanism by which the steering and supporting wheels may be swung through the larger angles necessary for making short turns and by which a differential movement is imparted to the steering wheels such that the wheels travel in concentric paths in making turns and the wheels roll without lateral slip in turning.

A further object of the invention is to provide a steering mechanism connected by gears to the two swiveled wheels of the vehicle in such a manner that the wheel nearest the center of the turning of the vehicle is swung faster than the other wheel, maintaining both wheels substantially at right angles to the radius of travel of the vehicle during turning movement.

Another object of the invention is to provide a four-wheeled lift truck of simple and inexpensive construction with superior operating characteristics.

Other objects, uses and advantages of the present invention will become apparent to those skilled in the art from the following description and claims and from the drawings in which:

Figure 5 is a fragmentary top plan view of the lift truck with parts broken away and shown in section and with parts omitted showing the steering mechanism on the same scale as Figures 3 and 4 and in the straight ahead position as in Figure 1 wherein the swiveled wheels are parallel;

Figure 6 is a fragmentary longitudinal vertical sectional view with parts omitted taken substantially on the line 6—6 of Figure 5 and on the same scale;

Figure 1:
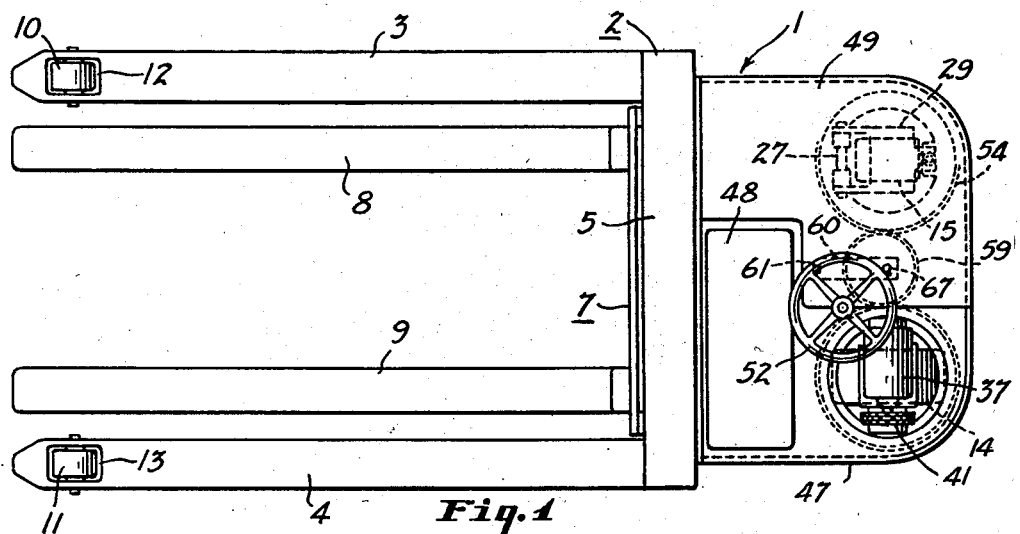
Figure 1 is a top plan view on a reduced scale of the lift truck of the present invention.

Figure 7 is a fragmentary top view similar to Figure 5 but showing the positions of the parts of the steering mechanism when the swiveled wheels are positioned for making a turn of relatively short radius; and Figure 8 is a diagrammatic top plan view on a reduced scale of the lift truck of Figures 1 and 7 showing the intersection of the horizontal axes of the swiveled wheels when the steering mechanism is positioned as shown in Figure 7, the outline of the truck being shown in dot-dash lines.

Figures 2, 4:
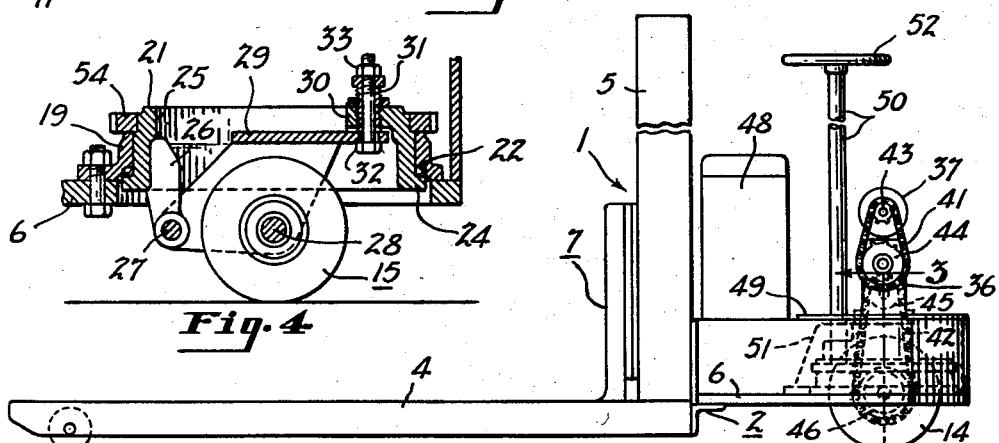
Figure 2 is a side elevational view of the truck of Figure 1 on the same scale and with parts broken away.
Figure 4 is a fragmentary longitudinal vertical sectional view taken substantially on the line 4—4 of Figure 3 and on the same scale.

Referring more particularly to the drawings in which like parts are identified by the same numerals in the several views, Figures 1 to 4 show a four-wheel lift truck 1 having a rigid metal frame 2 including a pair of laterally spaced, parallel, forwardly extending, supporting arms 3 and 4, a vertical guide standard 5 at the rear end of said arms and projecting upwardly therefrom, and a main supporting portion 6 extending rearwardly from said standard. A lifting platform 7 is mounted for vertical movement on the standard 5 and is provided with a pair of laterally spaced parallel arms 8 and 9 which extend forwardly from the guide standard parallel to the arms 3 and 4 and which move between the latter arms as shown in Figures 1 and 2 to a lower position wherein their upper surfaces are below or substantially in the same plane as the upper surfaces of the supporting arms 3 and 4.

A pair of small wheels 10 and 11 are mounted in coaxial relationship in the openings 12 and 13 at the front ends of the arms 3 and 4 for rotation about a fixed horizontal axis perpendicular to the arms 3 and 4 and to the longitudinal center line of the truck. In order to provide for steering of the truck, a pair of swiveled steering and supporting wheels 14 and 15 are provided in the rear of the truck on opposite sides of the longitudinal center line. The supporting portion 6 of the frame is provided with a pair of spaced, laterally alined, circular openings 16 and 17 for receiving the steering wheels. A pair of rigid annular bearing members 18 and 19 are mounted on the frame portion 6 and surround the openings 16 and 17, being secured to the frame at the margins of said openings. A pair of swiveling turrets or wheel supports 20 and 21 are journaled in the bearing members 18 and 19 for rotation about laterally alined vertical axes located in a plane perpendicular to the longitudinal center line of the truck and parallel to the horizontal axes of the front wheels 10 and 11. Suitable ball bearings 22 may be inserted between the bearing members and the turrets to reduce friction. The turrets have circumferential flanges 23 and 24 which extend radially below the bearing members to support the truck.

The turret 21 is provided with a central opening 25 to receive the wheel 15 and is provided with a downwardly extending flange or yoke 26 which projects into the opening 25 and below the frame as best shown in Figure 4. The yoke 26 is provided with alined circular openings to receive a horizontal cylindrical pivot pin 27. The wheel 15 has a horizontal shaft 28 mounted in alined circular openings in parallel side plates of a substantially U-shaped supporting member 29. Said side plates are provided with alined circular openings of a size to receive the pivot pin 27 and are mounted on opposite sides of the yoke 26 for pivotal movement about the horizontal axis of the pivot pin 27. The member 29 mounting the wheel 15 is pivotally mounted on the pivot pin 27 for swinging movement about the horizontal axis of said pin. The generally annular turret 21 has an inwardly projecting portion 30 with an internally threaded opening to receive a vertical tubular adjusting screw 31. The lower end of the adjusting screw engages a rearwardly extending portion of the supporting member 29 to prevent swinging of said member about its pivot pin 27 whereby the truck is supported by the wheel 15. The member 29 is provided with a circular opening concentric to the screw 31 to receive a bolt 32 which extends through the tubular screw 31 to hold said member in adjusted positions in engagement with said screw, the upper end of said bolt being threaded to receive a nut 33. By adjusting the screw 31, the position of the wheel 15 may be varied to compensate for the difference in the wear between the swiveled wheels 14 and 15 and to maintain the frame 2 substantially parallel to the floor. As herein shown, the wheel 15 has a diameter materially greater than that of the front wheels 10 and 11.

The steering wheel 14 has a diameter materially greater than that of the steering wheel 15 and serves as the traction wheel to propel the vehicle. The wheel has a horizontal shaft 34 with its opposite ends mounted in the annular lower portion of the turret 20. Said turret has an inverted U-shaped frame member or bridge 35 which extends over the traction wheel 14 to provide a support for a gear reduction unit 36 and an electric motor 37 which turn with the turret 20. The unit 36 has a flanged base 38 that is rigidly connected to the horizontal upper portion of the frame member 35 by a series of bolts 39 which are screwed into internally threaded openings 40.

Figure 3:
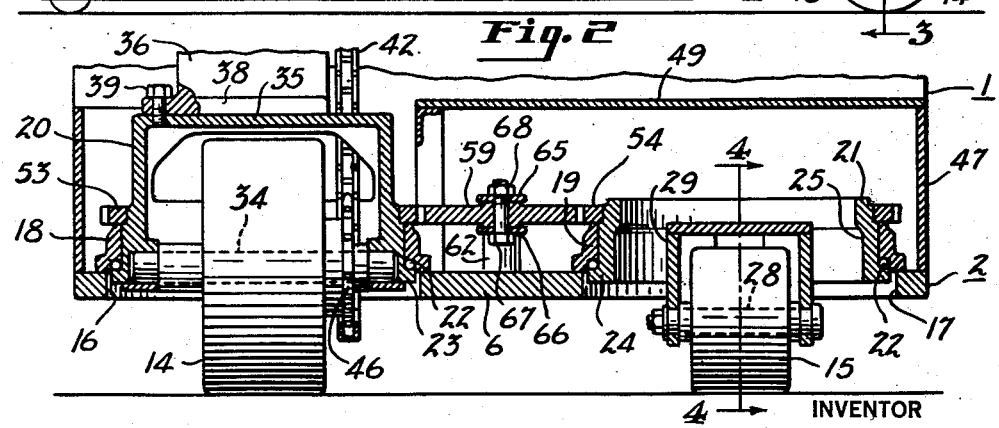
Figure 3 is a fragmentary transverse vertical sectional view of the truck taken substantially on the line 3—3 of Figure 2 and on a larger scale.

The traction wheel 14 may be driven by the electric motor 37 through sprockets, chains, gears or the like which reduce the relatively high speed of rotation of the motor shaft to a relatively low speed of turning of the traction wheel 14 on its shaft 34. As herein shown, the wheel 14 is driven through chains 41 and 42, sprocket wheels 43 to 46 and reduction gears in the unit 36, the sprocket wheel 46 being rigidly connected to the hub of the wheel 14 as best shown in Fig. 3. The electric motor, the gear reduction unit, and the traction wheel are combined into one power unit fixed to the upper part of the turret 20 for rotation therewith about a vertical axis and located at one side of the truck leaving ample space for the operator to ride at the other side of the truck.

As herein shown, the frame 2 has a marginal vertical wall 47 that extends from one side of the standard 5 along the sides and the rear of the truck to the other side of the standard. A battery 48 is mounted on the frame 2 at the rear of the standard 5 and with its center on the same side of the truck as the turret 20 to supply current to the electric motor 37. A flat horizontal riding platform 49 is mounted on the frame 2 at the top of the wall 47 and above the wheel 15, the battery 48 being spaced from the side of the truck to provide room for the operator to stand above the turret 21 at the side of the power unit carried by the turret 20. A vertical steering post 50 is journaled for rotation in an upwardly extending bracket 51 that extends upwardly from the horizontal bottom portion of the frame 2 and has a handwheel 52 mounted on its upper end which may be gripped by the operator when he is standing on the platform 49 to steer the truck.

The steering mechanism of the present invention includes a pair of main gears which are rotated by turning the handwheel 52 and which are operably connected to the turrets 20 and 21 to steer the wheels 14 and 15 and includes suitable gear means or the like to cause relative rotation of the main gears as a function of the total rotation thereof so as to maintain said wheels substantially perpendicular to the radius of turning of the truck. As herein shown, a pair of main ring gears 53 and 54 are rigidly mounted on the turrets 20 and 21, respectively, for rotation with said turrets about vertical axes which pass substantially through the horizontal axes of rotation of the wheels 14 and 15.

The gears may be of any suitable type but are preferably toothed gears of the same radius. The teeth may extend throughout the circumference of both main gears, in which case said main gears would preferably have the same number of teeth, but fewer teeth are required since it is unnecessary to rotate each main gear more than ninety degrees in either direction from the straight-ahead position shown in Fig. 5. As herein shown, the teeth of the ring gear 54 extend throughout more than half of the circumference of the gear and the remainder of said gear is smooth and reduced in radius.

An inwardly projecting stop member 55 may be mounted on the marginal wall 47 of the frame to limit turning movement of the gear 54 in either direction to any desired amount. It is usually preferable to prevent rotation of each of the gears 53 and 54 more than about ninety degrees in either direction. The stop member 55 engages one of the shoulders 56 and 57 of the ring 54 to limit rotation of the main gears in either direction.

The gears 53 and 54 shown herein are of the same pitch diameter and the same tooth spacing, the teeth of the gear 53 preferably extending throughout the circumference of the gear. A small pinion gear 58 is rigidly mounted on the bottom end of the steering post 50 for rotation therewith and has teeth meshing with those of the main gear 53 for rotating the turret 20. The post 50 may be rotated by turning the handwheel 52 to rotate the pinion 58 in either direction to steer the truck to the right or left.

According to the present invention suitable gearing is provided for operably connecting the main gears 53 and 54 so that the position of one gear is determined by the position of the other gear. Such gearing may include at least one small gear 59 that engages the periphery of one of the main gears 53 and 54 and that has a radius substantially less than that of said main gears. According to the present invention, the small gear is mounted for bodily movement along a tangent to the portion thereof engaging the main gear so that its center C is movable in a horizontal plane substantially along a line perpendicular to a radial line through the center of the main gear which engages the small gear, and means is provided for imparting a controlled harmonic motion to the center C in response to rotation of the gears as a function of the sum of the angles of rotation of the swiveled wheels 14 and 15 from their straight-ahead parallel positions as shown in Fig. 5.

Such harmonic motion may, for example, be obtained by constraining movement of the small gear 59 so that a point P thereon spaced a short distance from the center C is constrained to move substantially along a radial line through the center of the main gear and the center C is constrained to move substantially along a line perpendicular to said radial line. The means for constraining the gear 59 may include a pivoted link 60 having one end mounted on said gear to swing with respect thereto about a vertical axis through the point P and having its opposite end mounted on the frame 2 to swing with respect to the frame about a vertical axis through the perpendicular line along which the center C moves. The link 60 may be relatively long so that the point P moves substantially in a straight line or may, for convenience, be of a shorter length.

Movement of the center C during rotation of the small gear 59 causes the steering and supporting wheel to be rotated through an incremental angle $\phi$ in addition to the rotation of the wheel due to rotation of the small gear. Suitable means may be provided for rotating the turrets 20 and 21 relative to each other through an angle $2\phi$ as a function of the angle of rotation of the small gear 59 so that the wheels 14 and 15 are always substantially in the proper positions for making a turn.

A constraining means in the form of a pin and a straight slot or the like may be provided to cause the center C to move in a straight line, or the gear 59 may be mounted between the two gears 53 and 54 so that such means is unnecessary. As herein shown, the link 60 is the only constraint for the small gear 59 in addition to the main gears 53 and 54, and the small gear is mounted between the main gears so that the center C is maintained by said main gears substantially half way between the main gears and substantially on a line perpendicular to the line of centers of the main gears. As shown in Fig. 5, the point P is located on the transverse line of centers of the main gears and on the longitudinal center line of the truck midway between said main gears and directly behind the center C when the rear wheels 14 and 15 are in their straight-ahead positions parallel to the front wheels 10 and 11.

The link 60 is mounted at its front end on a pivot pin 61 having a vertical axis passing through said longitudinal center line. The pin 61 has a radially enlarged lower end portion 62 welded to or otherwise rigidly connected to the frame 2 and projects through the link 60 as shown in Fig. 6. A cotter pin 63 and a metal washer 64 may be provided to hold the link on the pin 61 so that the link and the gear 59 are supported in cantilever fashion on the frame. As shown herein, the link 60 is bifurcated and has arms 65 and 66 that extend above and below the gear 59 to support the same. The rear ends of the fork arms are provided with vertically alined circular openings of a size to receive a pivot pin or bolt 67 which projects upwardly through an internally cylindrical opening in the gear 59, the upper end of said bolt being threaded to receive a nut 68. The axis of the bolt 67 passes through the point P so that said point is the center of rotation of the gear 59 relative to the link 60. The link supports the gear 59 with its top surface substantially in the plane of the top surfaces of the main gears 53 and 54 substantially as shown in Fig. 3.

The link 60 is shown herein as extending forwardly from the small gear 59, but it will be apparent that similar results may be obtained when the link extends in the opposite direction and its pivot 61 is located on the longitudinal center line of the truck at the rear of the truck.

The small spur gear 59 preferably has a radius such that its angular movement is substantially equal to the sum of the angular movements of the wheels 14 and 15 from their straight-ahead positions shown in Fig. 5. Where the main gears 53 and 54 rotate the same angular amount as the wheels 14 and 15 during steering, the radius of said spur gear is preferably about half that of each main gear.

It will be noted that the center C of the small gear 59 moves farther from the centers of the main gears 53 and 54 as it moves away from the line of centers of said gears. Since the eccentricity $e$ of the small gear is usually relatively small compared to the distance between the centers of said main gears, the radial component of the movement of the center C is very small and the gear teeth remain in mesh at all times even if the teeth are relatively short.

The steering mechanism of the present invention moves the two swiveled wheels 14 and 15 of the truck so that the wheel nearest the center of turning is swung faster than the other wheel, maintaining both wheels substantially at right angles to the radius of travel of the vehicle during turning movement. The main ring gears 53 and 54 engage the teeth of the small gear 59 and constrain the movement of the center C so that said center moves substantially along the longitudinal center line of the vehicle perpendicular to the line of centers, and the link 60 constrains movement of the gear so that the pivot point P moves substantially along said line of centers whereby a predetermined controlled harmonic motion is imparted to the points P and C in response to rotation of the gears.

When the swiveled wheels 14 and 15 are in their straight-ahead positions parallel to each other and to the front supporting wheels 10 and 11, the point P is midway between the vertical axes of said swiveled wheels and the center C is at the forward limit of its travel nearest the front of the truck and nearest the horizontal axis of said front wheels as shown in Fig. 5. As the small gear is rotated through an angle $2\theta$ from the straight-ahead position shown in Fig. 5, the center C is moved a distance along the longitudinal center line of the vehicle which is a function of the angle $2\theta$ and the eccentricity, $e$, of the small gear ($e$ is the distance between the point P and the center C as indicated in Fig. 5). If the eccentricity $e$ is small compared to the length of the link 60 and if it is assumed that the center C moves in a straight line and that the point P moves along the line of centers of the main gears as is the case where the link 60 is very long, then the center C is moved a distance substantially equal to $e$ times the versine of the angle $2\theta$.

Rotation of the small gear 59 through the angle 2θ from the straight-ahead position of Fig. 5 results in turning of the swiveled wheel nearest the center of turning of the vehicle through an angle A and turning of the other swiveled wheel through a smaller angle B, the relative rotation between said swiveled wheels being caused by movement of the center C during such rotation. The movement of the center C from the straight-ahead position of Fig. 5 which takes place during such rotation of the small gear moves the main gears 53 and 54 substantially through the same angle φ but in opposite directions, the difference between A and B being substantially equal to 2φ. The angle φ is relatively small if the eccentricity, e, of the small gear is small compared to the distance, d, between the centers of the main gears 53 and 54.

If e/d is a small fraction and if it is assumed that the distance moved by the center C is substantially equal to e versine 2θ, it can be assumed that the tangent of the angle φ is substantially proportional to e/d times versine 2θ as will be apparent from an analysis of the gear arrangement. This approximate relationship between the angles φ and θ is of course based upon the assumption that the link 60 is extremely long, that the points C and P each move in a straight line, and that the eccentricity e is very small compared to the distance d. Asssuming for purposes of illustration that these assumptions are approximately correct, the tangent of the incremental angle φ is substantially equal to a constant times the versine of the angle 2θ.

If the gears could be moved in such a manner that tan $$\phi = \frac{k}{4} \text{ versine } 2\theta$$

where k is a constant less than one, then the angles θ and φ would be related as follows:

(I) $\cot(\theta-\phi) - \cot(\theta+\phi) = k +$ $$\frac{k \cot^2\theta \tan^2\phi}{1 - \cot^2\theta \tan^2\phi} = k + \frac{k^3 \sin^2 2\theta}{16 - k^2 \sin^2 2\theta}$$

From an analysis of the gear arrangement it will be apparent that the angle θ is substantially equal to $$\frac{R}{2r}(A+B)$$

where R is the radius of each main gear and r is the radius of the small gear. From an analysis of Fig. 8 it is seen that the horizontal axes of rotation of the swiveled wheels 14 and 15 will intersect in the horizontal axis of the front wheels 10 and 11 provided that cot B − cot A = d/D, where D is the distance from the horizontal axis of the front wheels to the line of centers of the rear wheels.

When the eccentricity e of the small gear is selected so that k is equal to d/D and where the radius R of each main gear is selected so as to be twice the radius r of the small gear, it is substantially correct to assume that the following relations exist:

$$2\theta = A+B \quad A = \theta+\phi \quad B = \theta-\phi \quad k = d/D$$

If these assumptions and the assumption that $$\tan \phi = \frac{k}{4} \text{ vers } 2\theta$$

happened to be substantially correct, the angles A and B would theoretically be related substantially as follows:

(II) $\quad \cot B - \cot A = d/D + \dfrac{k^3 \sin^2 2\theta}{16 - k^2 \sin^2 2\theta}$ Where D is substantially greater than d and where k is a small fraction substantially less than one, the term $$\frac{k^3 \sin^2 2\theta}{16 - k^2 \sin^2 2\theta}$$

of Equations I and II is obviously very small, and the horizontal axes of the swiveled wheels will theoretically intersect close to the horizontal axis of the front wheels (based upon the above assumptions).

Of course the theoretical calculations above are merely approximations due to the play between the gear teeth, the fact that the center C does not move exactly in a straight line, the fact that the point P does not move exactly in a straight line corresponding to the line of centers of the main gears, and for other reasons, particularly where a relatively short link is employed to constrain movement of the small gear so that the path of the point P is distinctly arcuate. However, in a truck of the type herein, wherein the ratio d/D is a small fraction and the ratio e/d is a small fraction, the steering mechanism of the present invention provides a close approximation to the theoretically correct steering action, particularly where the link 60 has an effective length many times the eccentricity e of the small gear. Although the link 60 shown in the drawings appears to be relatively short, it will be noted that the ratio of the eccentricity e to the length of said link is a very small fraction. It has been found that a fairly close approximation to the theoretically correct turning angles may be obtained with the steering mechanism even when the link 60 has a length not substantially greater than the diameter of the small gear 59.

In designing a steering mechanism for a truck of a given size the eccentricity e, the length of the link 60, the size of each gear 53, 54 and 59 and the size and number of teeth on each gear may be selected in accordance with the distances d and D so as to obtain an excellent steering action.

It will be apparent from Fig. 5 of the drawings that the steering mechanism of the present invention is symmetrical with respect to the longitudinal center line of the truck so that the same steering action is obtained whether the truck is making a left or right hand turn.

In the truck shown in the drawings the main gear 53 has 159 teeth and a pitch diameter of 13¼ inches, the pinion gear 58 has 24 teeth and a pitch diameter of 2 inches, the small gear 59 has 80 teeth and a pitch diameter of 6⅔ inches, the eccentricity of the small gear is about ⅝ inches, and the effective length of the link 60 is about 6½ inches. These figures are given by way of example to illustrate one form of the invention, but it will be apparent that different size gears may be employed and that the invention also may take various other forms.

In accordance with the provisions of the patent statutes, the principles of the present invention may be utilized in various ways, numerous modifications and alternations being contemplated, substitutions of parts and changes in instruction being resorted to as desired, it being understood that the embodiment of the invention shown in the drawings and described above is given merely for purposes of explanation and illustration and not for purposes of limitation.

Having described my invention, I claim:

1. In a steering mechanism for a truck, a pair of main circular gears having peripheral teeth, means mounting said gears in substantially the same plane for rotation about spaced parallel fixed axes disposed at the centers of said circular gears, a small gear having teeth meshing with the teeth of both main gears and having a center movable substantially in a direction perpendicular to a line passing through said parallel axes and intersecting the latter line midway between said parallel axes the center of the small gear being movable across said line, and means constraining movement of said small gear to cause a point on said small gear spaced from its center to move substantially parallel to said line.

2. In a steering mechanism for a truck, a pair of main circular gears having peripheral teeth, means mounting said gears in substantially the same plane for rotation about fixed spaced parallel axes at the centers of curvature of said gears, a small gear having teeth meshing with the teeth of both main gears and having a center movable substantially along a line perpendicular to a line passing through said parallel axes and intersecting the latter line midway between said centers, and means constraining movement of said small gear comprising a rigid link pivotally connected at one end to said small gear at a point spaced from its center and adjacent said last-named line and pivotally connected at its opposite end to a fixed member at a point near said first-named perpendicular line and spaced from said gears.

3. A steering mechanism for a vehicle having spaced swiveled wheels comprising two main circular toothed gears of substantially the same diameter, means mounting said main gears for rotation about fixed axes at their centers, a smaller toothed gear between said main gears and in mesh therewith, means for imparting a turning movement to the gears in either direction, and means for causing said smaller gear to be moved bodily in a linear path substantially perpendicular to a line passing through said axes during such turning movement.

4. A steering mechanism for a vehicle having spaced swiveled wheels comprising two main circular toothed gears of substantially the same diameter, means mounting said gears for rotation about fixed axes at their centers, a smaller toothed gear between said main gears and in mesh therewith mounted for movement bodily in a linear path substantially perpendicular to a line through said fixed axes between limits within which the intermeshing relationship of the gears is maintained, means for imparting a turning movement to the gears in either direction and means for causing said smaller gear to be moved from a starting position in which its center is spaced from said line through said axes so as to cause its center to be moved directly toward and across said line during such turning movement.

5. A steering mechanism for a vehicle having spaced swiveled wheels comprising two main circular toothed gears of substantially the same diameter, means mounting said gears for rotation about fixed axes at their centers, a toothed gear of substantially one half the diameter of said main gears between said main gears and in mesh therewith mounted for movement bodily at substantially right angles to a line passing through said axes between limits within which the intermeshing relationship of the gears is maintained, means for imparting a turning movement to the gears in either direction, and means for causing said smaller gear to be moved bodily directly toward said line in a direction substantially perpendicular to said line from a starting position in which its center is spaced from said line during such turning movement.

6. A steering mechanism for a vehicle having a frame and spaced steering and supporting wheels mounted on the frame for turning movements through not substantially less than about one quarter revolution from positions wherein the wheels are parallel, said steering mechanism comprising a main circular toothed gear operably connected to one of said wheels to turn the same, means mounting said main gear for turning about a fixed axis at its center, a smaller toothed gear held in mesh with said main gear and mounted for movement bodily during rotation thereof in a direction substantially tangent to said main gear between limits within which the intermeshing relationships of the gears is maintained and within which said smaller gear is free to rotate not substantially less than one half revolution in either direction from a neutral position in which said wheels are parallel, means carried by said frame for constraining movement of said smaller gear so that a point thereon spaced from its center of curvature moves substantially along a radial line through the center of said main gear, means constraining movement of the center of said smaller gear so that it moves in a direction substantially tangent to said main gear and generally perpendicular to said radial line and so that the smaller gear has a harmonic motion along the periphery of said main gear, means for causing relative rotation between said gears from said neutral position to move said one of said wheels through an angle $(\theta+\phi)$ where $\theta$ is the amount of turning movement of the wheel due to rotation of the smaller gear relative to its center and $\phi$ is the amount of turning movement of that wheel due to movement of the center of the smaller gear, $\phi$ being relatively small compared to $\theta$, and a main gear operably connected to the other of said wheels to turn the same, and means operably connecting said smaller gear to said last-named main gear to cause turning of said other of said wheels through an angle $(\theta-\phi)$ from said neutral position.

7. A four-wheeled truck having a frame and front and rear pairs of supporting wheels, the wheels of one pair being steering wheels, a support for each of said steering wheels journaled in said frame for turning movements about a substantially vertical axis, gearing connecting said wheel supports and constraining them to turn simultaneously in the same direction comprising an intermediate circular toothed gear and rotary movement transmitting means connecting said intermediate gear to each of said supports, said movement transmitting means including a gear element in meshing engagement with said intermediate gear, means for moving said gear element to effect turning movement of said gear in either direction from an initial position in which said steering wheels are in their parallel straight-ahead position, and means controlled by a turning movement of said intermediate gear in either direction from said initial position for causing the same to move bodily in the same direction away from said initial position and along a tangent to the portion thereof in meshing engagement with said gear element to impart an incremental turning movement to said gear element that increases the turning imparted by said intermediate gear to said gear element and the wheel support to which it transmits movement when said intermediate gear is turned in one direction from said initial position and that decreases the turning movement imparted by said intermediate gear to said gear element upon turning movement of said intermediate gear in the opposite direction from said initial position.

8. A vehicle having a pair of laterally spaced supporting wheels near one end of the vehicle and a pair of laterally spaced steering and supporting wheels near the opposite end of the vehicle, a support for each steering wheel journaled for swinging movement about a substantially vertical axis, means for turning the wheel supports simultaneously in the same direction to steer the vehicle including a pair of circular members connected to said wheel supports to turn the same, means mounting each of said circular members to turn about an axis located at its center, and an intermediate circular element of smaller radius, means constraining movement of said circular element during the turning thereof to cause a point thereon spaced from its center to move at all times along a path generally in the direction of a line passing through the axes of said circular members, and means providing a driving connection between the periphery of said circular element and the periphery of each of said circular members to cause said circular members to be rotated unequal amounts during a given turning movement of said circular element and for constraining bodily movement of said circular element to cause the center thereof to move at all times substantially in a linear path transverse to said line.

9. A four-wheeled truck having a pair of aligned laterally spaced supporting wheels near one end of the vehicle and a pair of laterally spaced steering and supporting wheels near the opposite end of the vehicle; a support for each steering wheel journaled for swinging movement about a substantially vertical axis; means for turning the wheel supports simultaneously in the same direction from positions wherein the steering wheels are parallel to steer the vehicle including a pair of circular members of substantially equal radius connected to said wheel supports to turn the same, means mounting each of said circular members to turn about an axis located at its center, and a circular element having a diameter not substantially different from said radius; means mounting said circular element for turning movement and for simultaneous linear bodily movement in a direction generally tangent to one circular member and providing a driving connection between the periphery of said circular element and the periphery of said one circular member to impart a turning movement to said one circular member and to cause the linear bodily movement of said circular element in one direction from a position wherein the steering wheels are parallel to add to the turning movement of said one circular member due to the turning of said circular element; and means providing a driving connection between the periphery of said circular element and the periphery of the other circular member to impart a turning movement to said other circular member and to cause the linear bodily movement of said circular element in said one direction to subtract from the turning movement of said other circular member due to turning of said circular element, the means providing said driving connections causing said circular members to swing from positions wherein the steering wheels are parallel in the same direction through angular distances which differ by an amount proportional to the bodily movement of said circular element.

10. A steering mechanism for a vehicle having a frame and spaced swiveled wheels comprising a pair of main gears of substantially the same radius each mounted for rotation about a fixed axis at its center and operably connected to one of said wheels, a small gear having a radius about half that of the main gears and having a center mounted for movement toward and away from the line of centers of said main gears, said small gear engaging both of said main gears substantially throughout said movement, and means including a link pivotally connected to said frame and to said small gear at a point spaced from its center of curvature for constraining movement of said small gear to cause movement of said point along a predetermined path generally following said line of centers, said point being substantially midway between the axes of the main gears when said wheels are parallel.

References Cited in the file of this patent

UNITED STATES PATENTS 2,713,918    Framhein _____ July 26, 1955

FOREIGN PATENTS 28,866    Great Britain _____ Dec. 16, 1896